(12) United States Patent
Graves et al.

(10) Patent No.: US 6,607,185 B2
(45) Date of Patent: Aug. 19, 2003

(54) SUSPENSION FORK HAVING RESERVED ARCH

(75) Inventors: Brent T. Graves, Woodland Hills, CA (US); James C. Rathbun, Burbank, CA (US)

(73) Assignee: Answer Products, Inc., Valencia, CA (US)

( * ) Notice: Subject to any disclaimer, the term of this patent is extended or adjusted under 35 U.S.C. 154(b) by 0 days.

(21) Appl. No.: 09/978,042

(22) Filed: Oct. 17, 2001

(65) Prior Publication Data

US 2003/0071400 A1 Apr. 17, 2003

(51) Int. Cl.[7] .............................. F16F 5/00; F16F 9/00; B62K 25/08
(52) U.S. Cl. ...................... 267/64.26; 267/226; 267/34; 188/24.11; 188/316; 280/276
(58) Field of Search ................... 188/297, 304, 188/313, 316, 317, 24.11; 280/275, 276, 279, 280; 267/34, 64.26, 140.11, 140.12, 217, 221, 225, 226, 248, 249, 256, 64.15

(56) References Cited

U.S. PATENT DOCUMENTS

| | | | |
|---|---|---|---|
| 4,971,344 A | | 11/1990 | Turner |
| 5,078,417 A | * | 1/1992 | Mouritsen .................... 280/280 |
| 5,431,426 A | * | 7/1995 | Ijams et al. .................. 280/276 |
| 5,632,362 A | * | 5/1997 | Leitner ......................... 188/26 |
| 5,636,716 A | * | 6/1997 | Sugimoto et al. ........ 188/24.22 |
| 5,653,007 A | | 8/1997 | Boyer et al. |
| D401,537 S | | 11/1998 | Turner |
| 6,217,049 B1 | * | 4/2001 | Becker ........................ 188/313 |
| 6,260,832 B1 | * | 7/2001 | Vignocchi et al. .......... 280/275 |
| 6,343,807 B1 | * | 2/2002 | Rathbun ..................... 280/276 |

OTHER PUBLICATIONS

Jace Shnell "Deja Vu? The Reverse Brake Arch: Who Was First," *Mountain Biking*, May 2002, Cover and pp. 74–75.
Pace RC–35 Modular Front–End Fork Product Catalog; 1993.
Pace RC–36 EVO Suspension Forks Owners Manual; 1998.
Pace RC–36 EVO III & RC–37 EVO Suspension Service Manual; Sep. 1999.
Pace RC–38 Air Force Suspension Service Manual; Jan. 2000.
Pace RC–36 Pro Class 2 Suspension Service Manual; Sep. 2000.
Pace Hardware Catalog; 2000.

* cited by examiner

*Primary Examiner*—Jack Lavinder
*Assistant Examiner*—Thomas J. Williams
(74) *Attorney, Agent, or Firm*—Lawrence E. Laubscher, Sr.

(57) ABSTRACT

A front suspension fork for cycles includes an inverted U-shaped reversed arch having downwardly extending legs that are integral with the upper ends of the outer sections of the telescopic fork, thereby to define a rigid unitary slider component fork. The reversed arch is inclined rearwardly at an acute angle relative to the vertical plane of the fork. Strengthening mass portions extend forwardly from the lower ends of the arch between the inner fork sections, thereby to increase the rigidity of the slider component without interfering with brake operation.

11 Claims, 6 Drawing Sheets

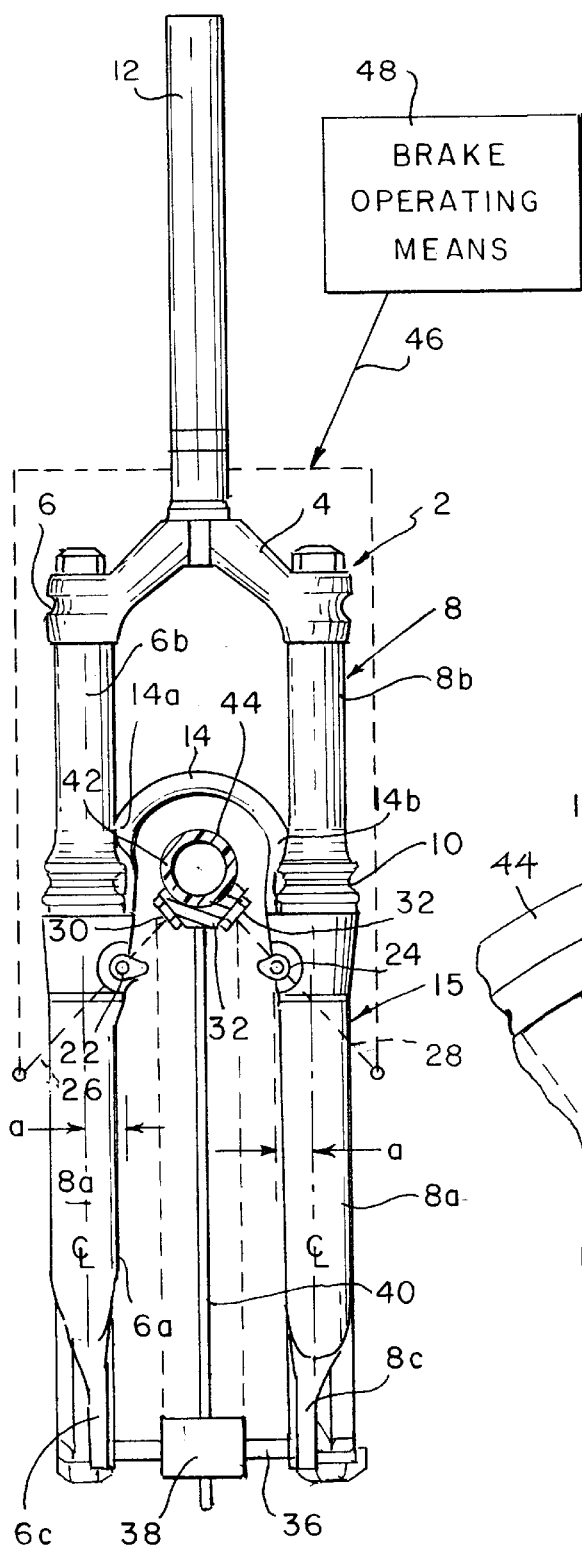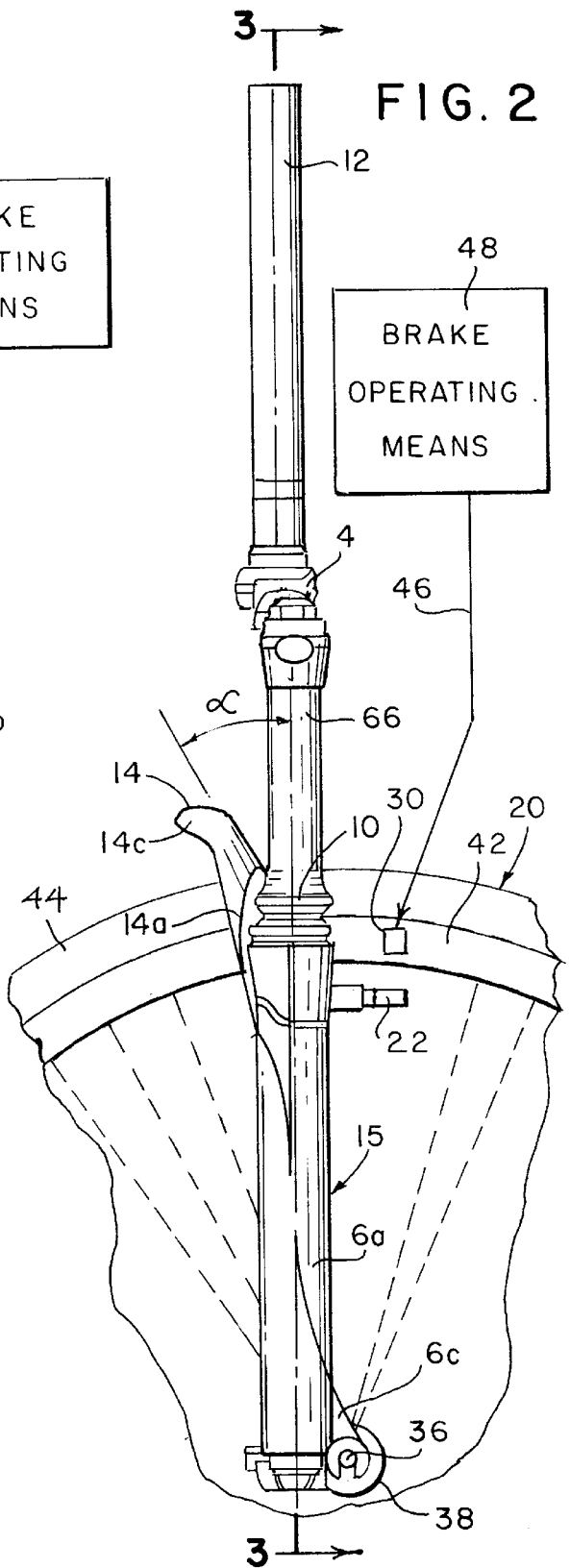

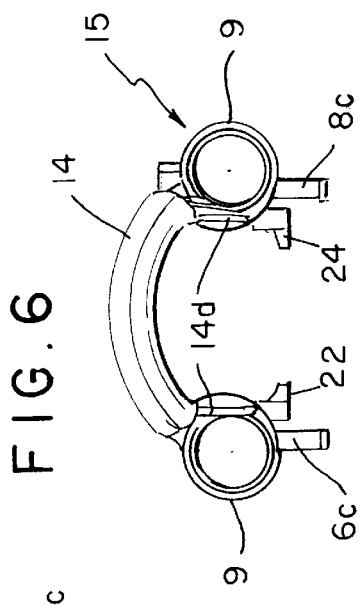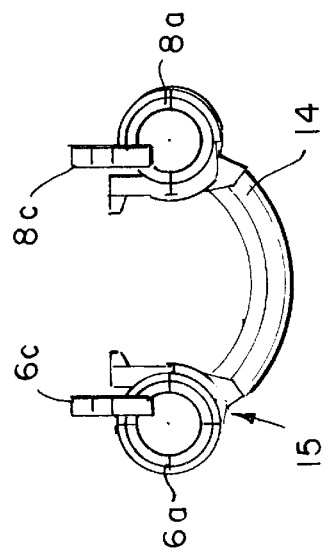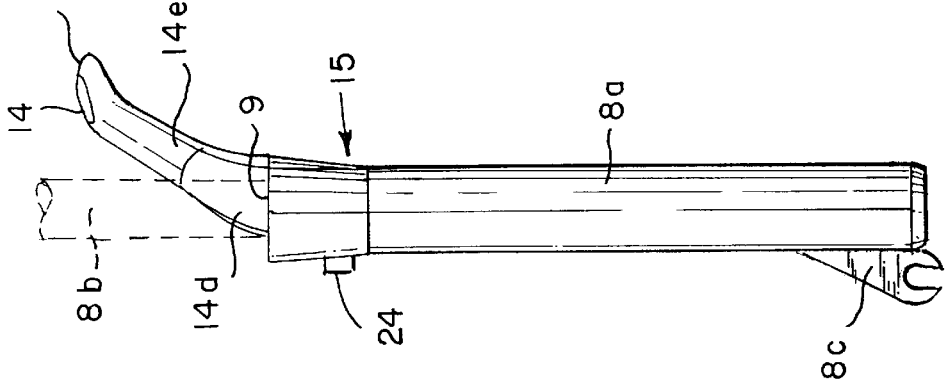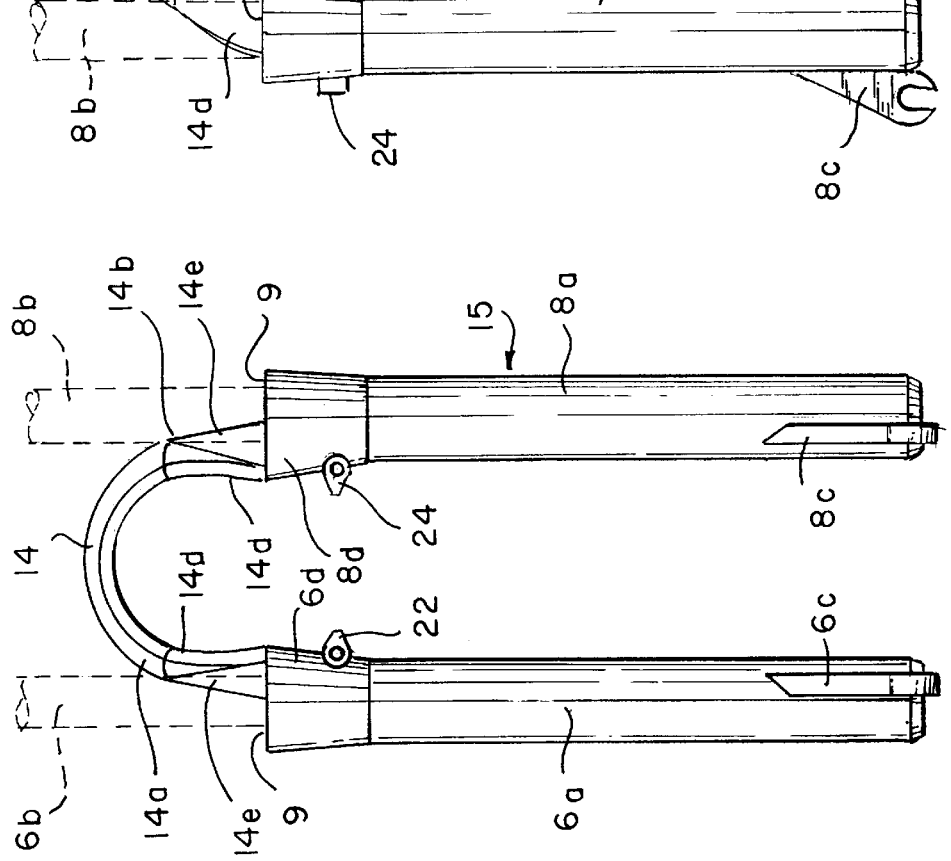

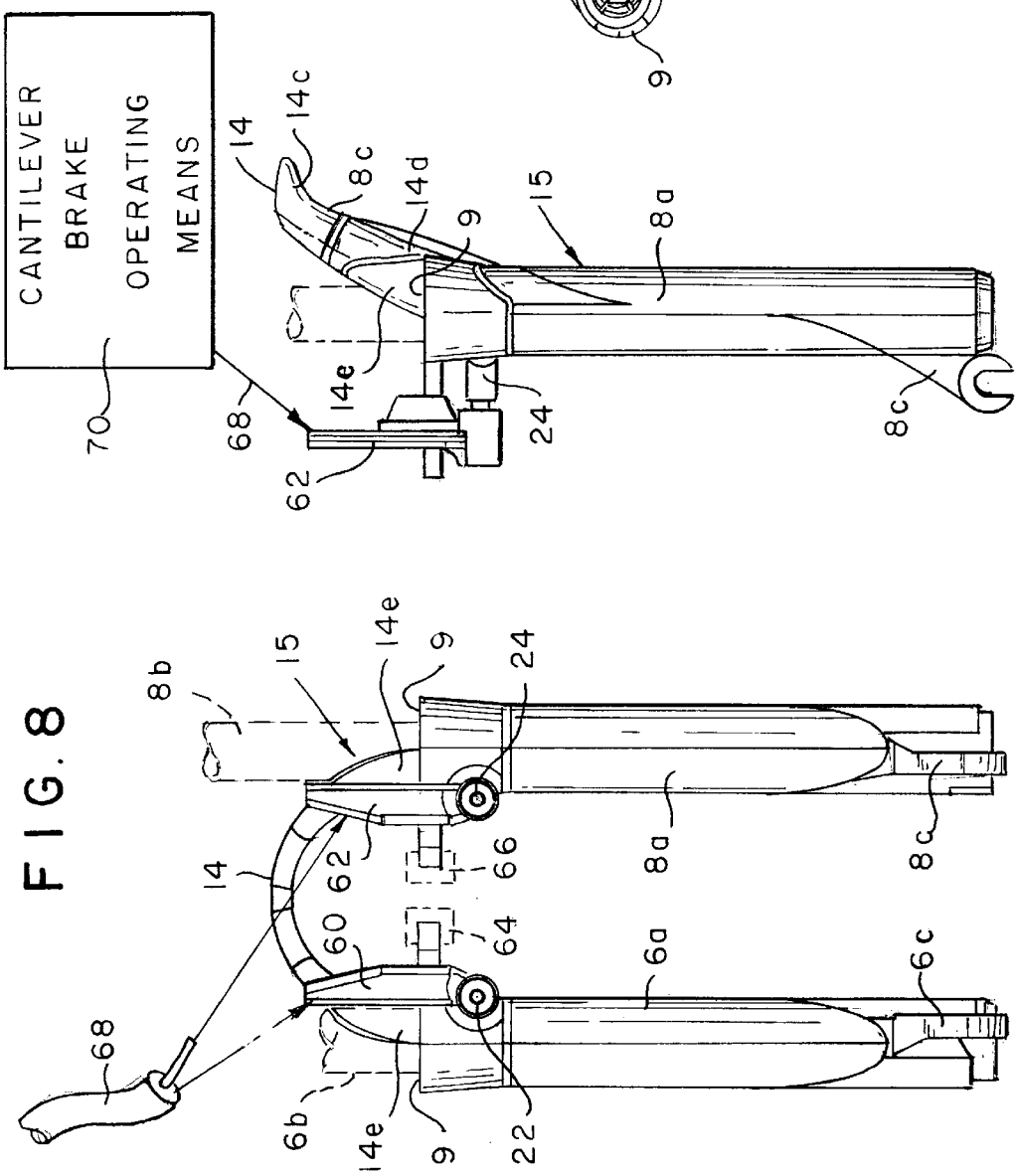

SUSPENSION FORK HAVING RESERVED ARCH

FIELD OF THE INVENTION

A suspension fork for bicycles and motorcycles includes a reversed arch that is integrally connected between the upper ends of the outer telescopic leg sections of the fork. The reversed arch is inclined rearwardly of the fork, thereby to reduce the possibility of interference with the brake means of the cycle.

BACKGROUND OF THE INVENTION

Brief Description of the Prior Art

Front suspension forks for cycles such as bicycles and in motorcycles are well known in the prior art, as evidenced by the patents to Turner U.S. Pat. Nos. Des. 401,537 and 4,971,344, and Boyer, et al., U.S. Pat. No. 5,653,007. In such known suspension forks, the vertical leg portions of the fork comprise a pair of telescopic tubular sections the inner ones of which are connected at their upper ends with a horizontal crown that is connected intermediate its ends with the handlebar steerer rod or shaft. The outer fork sections (i.e., the "sliders") are connected at their upper ends by a transversely extending arch, thereby to define a unitary slider component the lower ends of which are connected with opposite ends of the wheel axle. Shock absorber means are provided that include a compression spring that biases the sections apart and damper means are provided for dampening fork vibratons.

As shown by the aforementioned Turner utility patent, the fork sliders initially consisted of three or more pieces bolted together. The arch was the piece that tied the right and left sliders together so they moved in tandem. Early technology and manufacturing techniques yielded forks that were very flexible. To fight the flex problem and reduce hardware proliferation, the cantilever pivot bolts were also used to anchor the arch to the sliders. Since cantilever rim brakes are generally mounted on the front of the fork, the arch was also mounted on the front. As fork designs and technology progressed, the sliders became increasingly integrated. Eventually, as shown by the Boyer et al., patent, the sliders were bonded instead of bolted together, thereby to define a unitary slider component. This relieved the arch of its previous duties, but it remained on the front nonetheless. Finally, as shown by the Turner design patent, the sliders were cast as one-piece.

In these known suspension forks, the wheel brake operating means are generally mounted forwardly of the suspension fork, and the arch similarly extends between the forward portions of the upper ends of the outer concentrically arranged fork section. Consequently, these forks have the disadvantage that the arch connection between the fork leg outer sections cannot be optimized for strength without interfering with the brake operation and design of the brake means.

Pace Cycles Limited of York, England, has proposed suspension forks that include arches that are clamped or bolted to the front and/or rear surfaces of the outer tubular sections of the suspension fork. In the Pace RC-35 suspension fork that was offered for sale in 1993, a separate arch component was clamped onto the rear side of the fork, as were the brake means. In the Pace forks, the arches and the brake means were mounted on the same side of the fork, whereby the arches interfere to some extent with the operation of the brake means, since as with other designs, the brake means are coincident with the arch.

The present invention was developed to avoid the above and other drawbacks of the suspension forks of the prior art. During its development of its one-piece cast sliders, Applicant discovered that the greatest increase in stiffness resulted when the arch was 'wrapped' and thickened around the inside of the sliders, but the amount of wrap and the thickness of the possible material was limited. This was due to the fact that the additional wrap meant and material greater mass, and this greater mass interfered with the operation of the cantilever brakes. A reduced opening made wheel installation and removal of the wheel difficult or impossible. In the end, the state-of-the-art sliders were a compromise between optimal stiffness on the one hand, and ease of wheel installation and removal on the other hand.

SUMMARY OF THE INVENTION

Accordingly a primary object of the present invention is to provide a suspension fork in which the arch means for connecting the fork leg outer section are inclined rearwardly at an acute angle relative to the vertical plane of the fork. In this manner, the reversely inclined arch does not interfere with the operation of the brake means arranged forwardly or rearwardly of the fork.

According to another feature of the invention, in order to obtain a higher stiffness to weight ratio, each of the lower ends of the inverted U-shaped arch includes a stiffening wrap mass that extends between the lower leg portions of the arch and the adjacent upper portions of the respective outer fork sections, without negatively affecting operation of the brake means. The resulting increase of the torsional stiffness of the sliders reduces binding of the sliders relative to the stanchions over which they slide during the suspension movement, thereby offering a smoother ride. The arch may be nearly ½ inch shorter owing to its relative position behind the axle of the wheel, whereby the shorter arch is stiffer and lighter as well.

According to a further object of the invention as applied to a fork using cantilevered rim brake means, the brake posts extend forwardly of the fork and are arranged off-center in the direction of each other. The brake posts are reduced in height, since the brake arms no longer must clear a front-mounted arch. This permits the brakes to be arranged closer to the centerline of the fork, thereby decreasing their twisting leverage over the outer fork sections. This results in cantilever bracing with improved modulation and power.

A further object of the invention is to provide a suspension fork for use with disc brake means wherein the slider member includes a rearwardly inclined arch connected between the upper ends of the lower sections, and disc brake mounting posts arranged at the lower rear end of one of the lower leg sections, thereby to provide a rigid slider unit.

According to another object of the invention, the rearwardly inclined reversed arch shields the seals of the fork against dirt and debris produced by rotation of the associated tire. The reversed arch construction affords improved slider torsional stiffness, reduction in slider weight, and protection of the fork seals.

BRIEF DESCRIPTION OF THE DRAWINGS

Other objects and advantages of the invention will become apparent from a study of the following specification when viewed in the light of the accompanying drawings, in which:

FIGS. 1 and 2 are front and left hand side views, respectively, of the improved suspension fork of the present invention as used in connection with rim brake means;

FIGS. 4–7 are front, right hand side, top, and bottom views of the rigid slider component defined by the integral arch and outer leg sections;

FIGS. 8–10 illustrate the manner of mounting cantilever brake means on the forwardly extending brake posts of the slider component;

DETAILED DESCRIPTION

Figure 3:
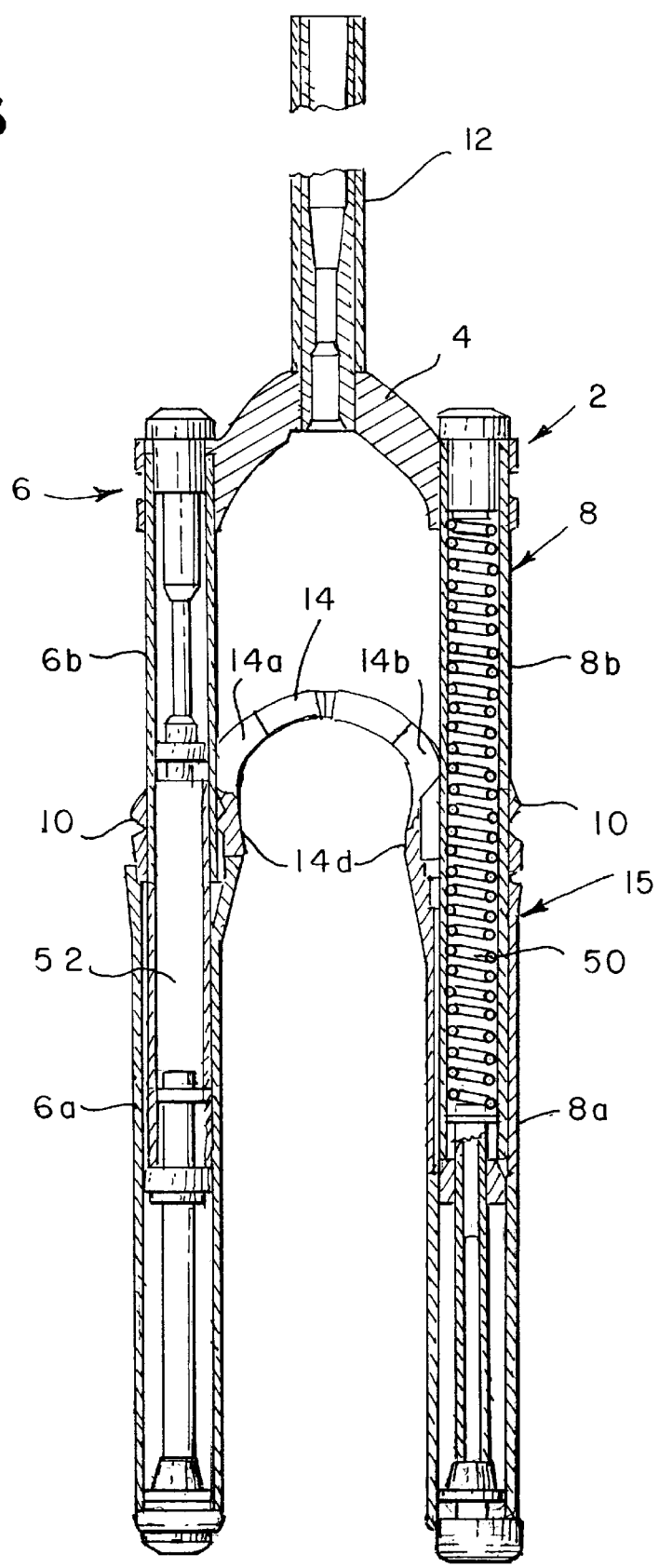
FIG. 3 is a sectional view taken along line 3—3 of FIG. 2.

Referring first more particularly FIGS. 1 and 2, the improved reversed arch suspension fork 2 includes a horizontal crown portion 4 and a pair of downwardly depending leg portions 6 and 8. As is known in the the art, the leg portions are telescopic and include a pair of outer tubular sections 6a and 8a arranged concentrically about a pair of inner leg sections 6b and 8b, respectively. The outer and inner sections are arranged for relative longitudinal sliding displacement, flexible tubular seal means 10 being provided for sealing the gap between the upper end of the outer sections 6a and 8a and the adjacent circumferential surfaces of the inner sections 6b and 8b. Intermediate its ends, the crown portion 4 carries the vertically upwardly extending steerer rod 12, that supports the handlebar, steering means (not shown).

In accordance with the present invention, the outer fork sections 6a and 8a are connected at their upper ends by an integral inverted U-shaped reversed arch portion 14 having leg portions 14a and 14b that are integral with the upper ends of the outer section 6a and 8a, respectively, thereby to define a rigid unitary slider component 15 (FIGS. 8–10). As best shown in FIG. 2, in accordance with a characterizing feature of the invention, the reverse arch 14 is inclined rearwardly of the fork by the acute angle α relative to the vertical axis of the fork. At its upper end, the reverse arch 14 includes a rearwardly projecting flange 14c that protects the cycle frame and the cycle operator from the mud and debris that is thrown upwardly by the cycle front wheel 20.

Extending forwardly from the outer fork sections 6a and 8a are a pair of brake posts 22 and 24 that pivotally support the brake arms 26 and 28 that carry brake shoes 30 and 32, respectively. At their lower ends, the outer fork sections include forwardly extending integral support portions 6c and 8c having downwardly extending slots for receiving the ends of the wheel axle 36. Rotatably supported on the axle 36 is the wheel hub 38 having radially extending spokes 40 that support the wheel rim 42 on which is mounted the resilient tire 44. The brake shoes 30 and 32 are displaced into braking engagement with the wheel rim 42 by the brake cables 46 that are manually operable by the brake operating means 48, as is known in the art.

Referring now to FIG. 3, the hollow fork leg 8 contains the conventional shock absorbing means including the compression spring 50, and the fork leg 6 contains the conventional fluid damping means 52. As will be described in greater detail below, in accordance with another important feature of the invention, the adjacent portions of the lower extremities of the reverse arch leg portions and the upper ends of the outer leg sections 6a and 8b, respectively, merge into thickened wrap-around strengthening masses 14d. These strengthening wrap-around masses provide torsional stability to the slider fork component 15. As shown in FIG. 1, the brake support posts 22 and 24 are displaced by the distance "a" inwardly toward each other from the vertical transverse center lines of the leg portions of the fork. Since the brake posts 22 and 24 extend forwardly of the fork, and since the reverse arch portion 14 is inclined rearwardly of the fork, the arch 14 presents no interference with the operation of the brake operating cables 46, and accordingly, the brake posts may be shorter than those normally used with cantilevered type brakes. Furthermore, by mounting the brake posts 22 and 24 on the wrapped around strengthening mass portions 14a and 14b of the reverse arch and the upper ends of the outer sections, a more stabilized and positive braking operation is achieved.

Referring to FIGS. 4–7, it will be seen that the cast integral lower ends of the arch leg portions 14a and 14b include wrap around strengthening arch mass portions 14e that extend inwardly between the inner fork sections 6b and 8b, respectively. These wrap-around mass portions merge with inwardly thickened leg mass portions 6d and 8d that extend inwardly from the adjacent upper end surfaces of the outer fork sections 6a and 8a, respectively. The upper extremities of the outer sections 6a and 8a terminate in horizontal annular shelves or ledges 9 that support the flexible annular seals 10 of FIG. 1 within recesses 14e (FIGS. 8 and 9) contained within the lower ends of the arch leg portions.

As shown in FIG. 4, the forwardly extending brake posts 22 and 24 are arranged, adjacent each other at the thickened upper end portions 6d and 8d of the outer fork sections 6a and 8a, respectively. Referring to FIGS. 8–10, cantilevered brake arms 60 and 62 are pivotally mounted on the brake posts 22 and 24, respectively, said brake arms carrying brake shoes 64 and 66 arranged for braking engagement with the wheel rim, now shown. The cantilevered brake arms are pivoted toward the braking positions by the brake cable 68 of the cantilever brake operating means 70, as is know in the art.

Thus, the wrap around arch portions 14d and the thickened upper end portions 6d and 8d of the outer fork sections 6a and 8a serve to strengthen the torsional stability of the unitary lower fork component that carries both the wheel axle 36 and the brake arm means 26, 28 (of FIG. 1) and 60, 62 (of FIG. 8).

Referring now to the disc brake embodiment of the invention shown in FIGS. 11–15, the front fork 102 includes a crown 104 connected between the upper ends of the upper sections 106b and 108b of the fork legs 106 and 108. The reverse arch 114 is connected between the upper ends of the lower leg sections 106a and 108a, thereby to define the rigid lower slider unit 115 shown in FIGS. 13–15. The wheel and hub assembly 139 including a brake disk 133 is mounted between the forwardly extending integral mounting portions 106c and 108c at the lower ends of the lower leg sections. The disc brake operating means 129 is bolted too the rear of the fork for operation by the hand-grip operating means 148, as is known in the art.

Figure 11:
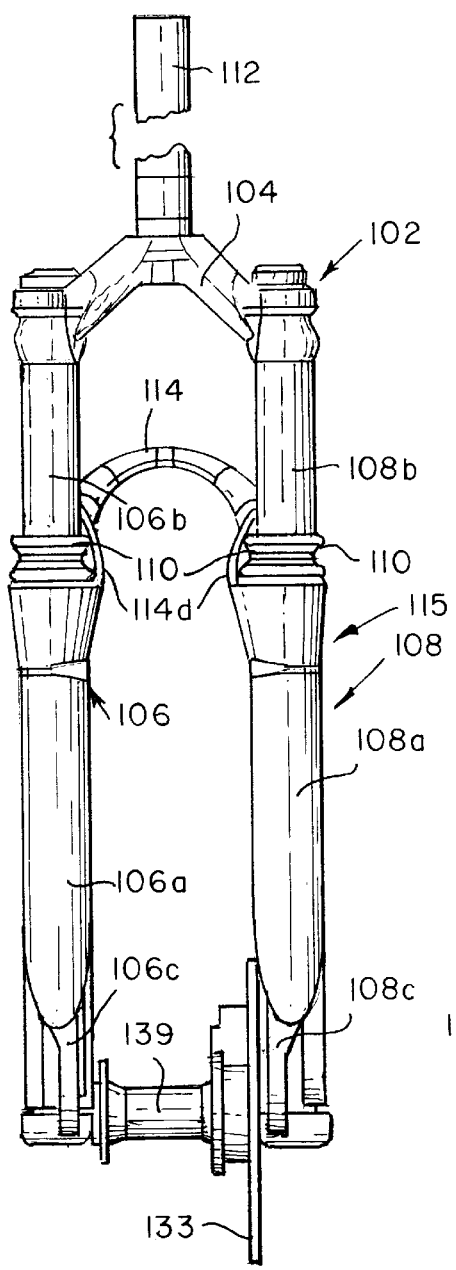
FIGS. 11 and 12 are front and right hand views of the improved fork as used with disc brake means.
Figure 12:
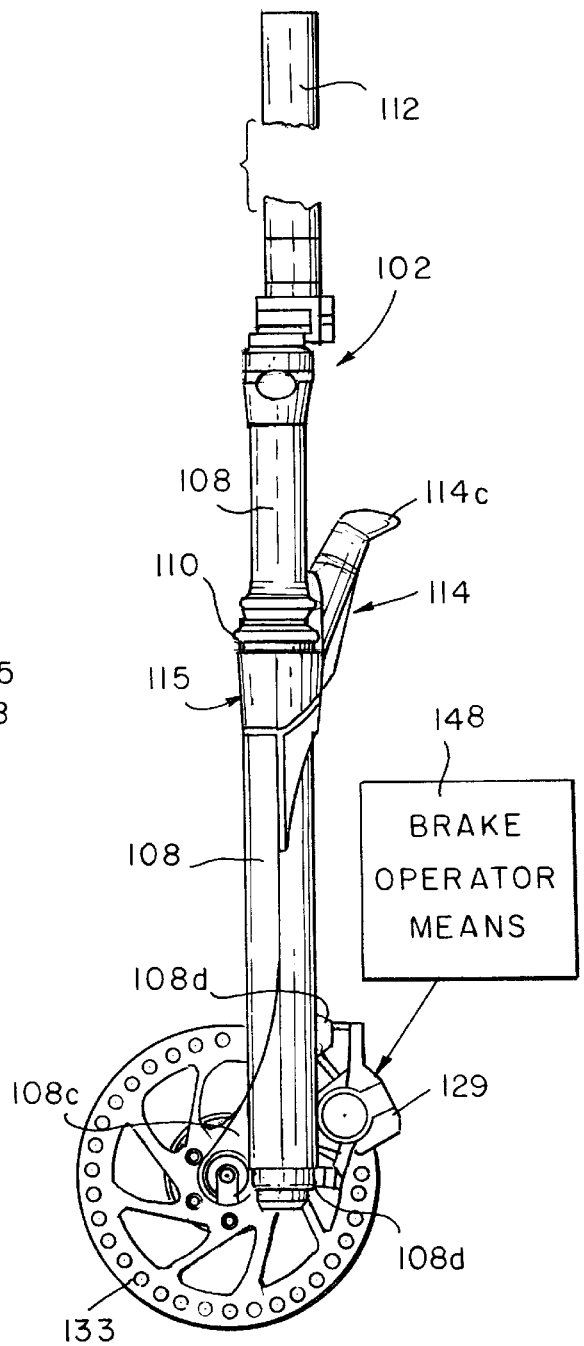
Figure 15:
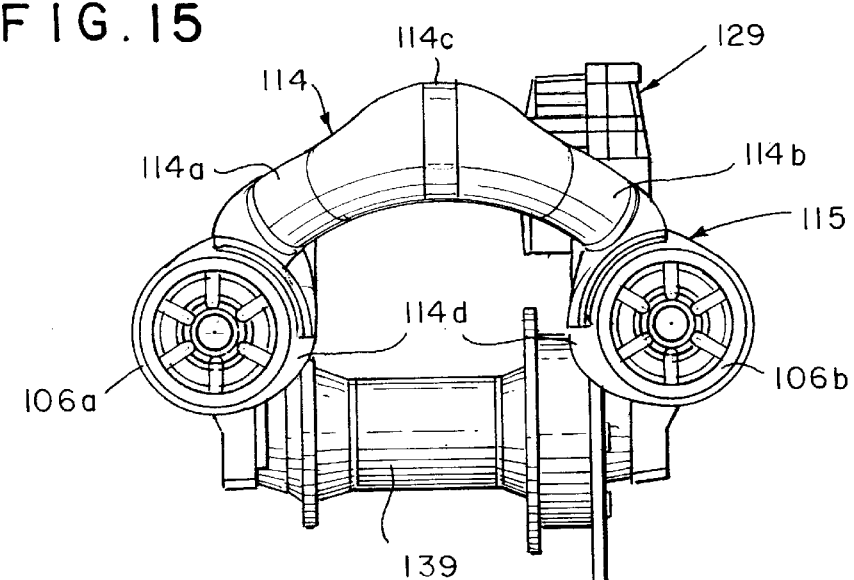
FIGS. 13–15 are front elevation, right elevation, and top plan views, respectively, of the slider component of the fork of FIGS. 11 and 12.
Figure 13:
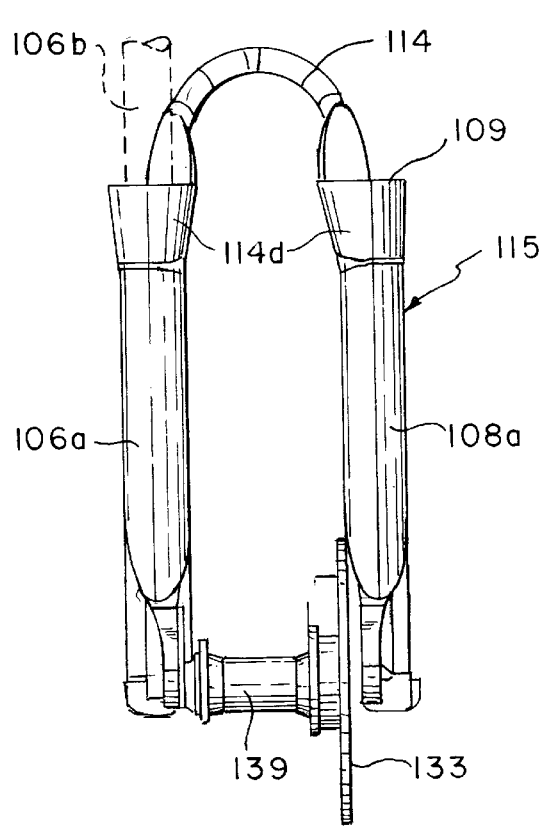
Figure 14:
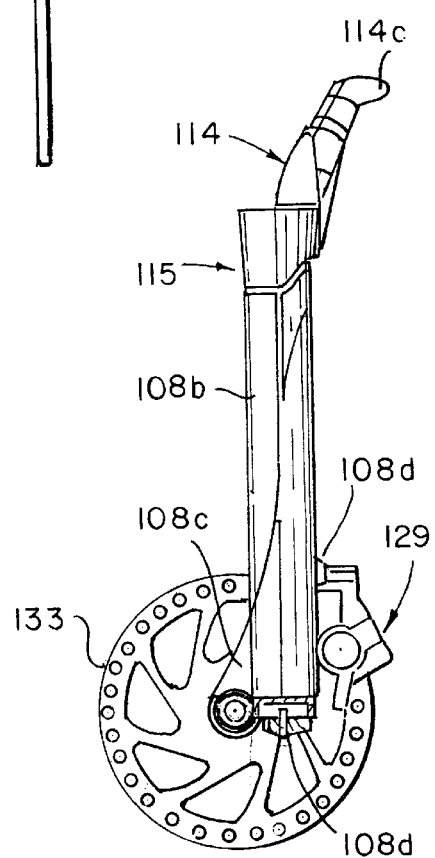

As best shown in FIGS. 11 and 13, the suspension fork includes strengthening masses 114d that extend from the reverse arch portion 114 between the upper ends of the lower fork sections 106a and 106b. The ledges 109 support the bellows seals 110 of FIG. 11. The resultant fork suspension fork 102 thus has a rigid compact construction with strengthening masses provided between the upper ends of the lower sections without any interference with brake operation, or with the removal of the front wheel from the fork.

While in accordance with the provisions of the Patent Statutes the preferred forms and embodiments of the invention have been illustrated and described, it will be apparent to those skilled in the art that various changes may be made without deviating from the inventive concepts set forth above.

What is claimed is:

1. A reversed arch front suspension fork assembly for cycles having a front wheel rotatably mounted on an axle, and brake means for braking the front wheel, comprising:
    a vertical generally U-shaped inverted suspension fork having front and rear sides, said fork including:
        (a) a horizontal crown portion (4) having a pair of ends;
        (b) a pair of vertical sectional telescopic leg portions (6,8) extending downwardly from said crown portion ends, respectively, each of said fork leg portions including:
            (1) an inner upper tubular fork section (6b,8b) having an upper end connected with the associated end of said crown portion; and
            (2) an outer lower tubular fork section (6a,8a) slidably mounted concentrically about said inner fork section, said outer fork section having upper and lower ends, said outer fork section including axle connecting means integral with the lower end of said outer fork section for connecting one end of the front wheel axle with said outer fork section;
        (c) a generally vertical reversed arch portion (14) integral with and connected between the upper ends of said outer leg sections to define a unitary rigid slider component (15), said reversed arch portion having an inverted generally U-shaped configuration defining a pair of downwardly extending arch leg portions (14a,14b) the lower ends of which are integral with the upper ends of said outer fork sections, respectively, said reversed arch portion being inclined rearwardly at an acute angle (α) relative to the vertical plane containing said fork; and
        (d) brake connecting means for connecting front wheel brake means with said rigid slider component;
        (e) said arch leg sections including at their upper ends inwardly directed thickened end portions (6d,8d);
        (f) said reversed arch leg portions including at their lower extremities wrap-around mass end portions (14d) that extend forwardly between said inner fork sections for connection with said arch leg upper end thickened portions, respectively, thereby to increase the torsional stiffness of the fork.

2. A reversed arch suspension fork assembly as defined in claim 1, wherein said axle connecting means include integral portions that extend forwardly from the lower ends of said outer fork sections, respectively, said integral connecting portions containing opposed slots for receiving the ends of the front wheel axle, respectively.

3. A reversed arch suspension fork assembly as defined in claim 2, and further including:
    (e) shock absorber means connected between the sections of one of said fork leg portions, said shock absorber means including a helical compression spring arranged concentrically within said one fork leg for biasing the sections thereof axially apart;
    (f) dampening means arranged in the other of said fork leg portions for dampening the relative movement between the sections of said front fork leg portions; and
    (g) a pair of flexible bellows-type annular seals mounted concentrically about the upper ends of said outer fork sections, respectively, said seals extending upwardly concentrically about and in sliding engagement with the outer circumferential surfaces of said inner fork sections, thereby to seal the gap between the upper end of said outer fork sections and the adjacent circumferential surface of said inner fork sections, respectively.

4. A reversed arch suspension fork assembly as defined in claim 3, wherein said reversed arch strengthening wrapped mass end portions contain recesses that define shelves for receiving and supporting the lower ends of said annular seals, respectively.

5. A reversed arch suspension fork assembly as defined in claim 2, and further including:
    (e) disc brake means connected with said brake connecting means.

6. A reversed arch suspension fork assembly as defined in claim 5, wherein said brake connecting means includes a plurality of vertically spaced connecting portions arranged on the rear side of the lower end of one of said lower sections.

7. A reversed arch suspension assembly as defined in claim 6, and further including:
    (f) a front wheel assembly including:
        (1) an axle mounted between said axle connecting means;
        (2) a hub rotatably mounted concentrically about said axle;
        (3) an annular metal rim supported by said hub;
        (4) a resilient tire mounted concentrically about said rim; and
        (5) an annular brake disk connected with said hub for rotation about said axle.

8. A reversed arch assembly as defined in claim 2, and further including:
    (e) cantilevered rim brake means connected with said brake connecting means.

9. A reversed arch assembly as defined in claim 8, wherein said brake connecting means includes a pair of brake posts extending forwardly of the upper ends of said fork lower sections, respectively, said cantilevered rim brake means being arranged on said brake posts forwardly of said fork.

10. A reversed arch suspension fork assembly as defined in claim 9, and further including:
    (f) a front wheel assembly having:
        (1) an axle mounted between said axle connecting means of said outer fork sections;
        (2) a hub rotatably mounted concentrically on said axle;
        (3) an annular metal rim supported by said hub; and
        (4) a resilient tire mounted concentrically about said rim;
        (5) said brake means including brake pads arranged for engagement with opposite sides of said rim.

11. A reversed arch suspension fork assembly as defined in claim 10, wherein said brake posts are arranged adjacent the lower extremities of said reversed arch strengthening wrapped mass end portions, said brake posts being arranged off-center toward each other relative to the vertical planes that pass through the longitudinal axes of the fork leg portions normal to the plane of the fork, respectively.

* * * * *